United States Patent
Zhu et al.

(10) Patent No.: US 10,158,845 B2
(45) Date of Patent: Dec. 18, 2018

(54) TILEABLE STRUCTURED LIGHT PROJECTION FOR WIDE FIELD-OF-VIEW DEPTH SENSING

(71) Applicant: Facebook Technologies, LLC, Menlo Park, CA (US)

(72) Inventors: Zhaoming Zhu, Redmond, WA (US); Nicholas Daniel Trail, Bothell, WA (US); Renzo De Nardi, Seattle, WA (US); Richard Andrew Newcombe, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 190 days.

(21) Appl. No.: 15/409,314

(22) Filed: Jan. 18, 2017

(65) Prior Publication Data
US 2018/0205937 A1    Jul. 19, 2018

(51) Int. Cl.
| | |
|---|---|
| H04N 7/00 | (2011.01) |
| H04N 13/254 | (2018.01) |
| G06F 3/01 | (2006.01) |
| H04N 13/332 | (2018.01) |
| G01B 11/25 | (2006.01) |
| G06T 7/521 | (2017.01) |

(52) U.S. Cl.
CPC ....... *H04N 13/254* (2018.05); *G01B 11/2513* (2013.01); *G06F 3/013* (2013.01); *G06T 7/521* (2017.01); *H04N 13/332* (2018.05)

(58) Field of Classification Search
CPC .... H04N 13/254; H04N 13/332; G06T 7/521; G01B 11/2513; G06F 3/013

USPC ......................................................... 348/39
See application file for complete search history.

(56) References Cited

U.S. PATENT DOCUMENTS

| | | |
|---|---|---|
| 8,050,461 B2 | 11/2011 | Shpun et al. |
| 8,350,847 B2 | 1/2013 | Shpunt |
| 8,390,821 B2 | 3/2013 | Shpunt et al. |
| 8,400,494 B2 | 3/2013 | Zalevsky et al. |
| 8,462,207 B2 | 6/2013 | Garcia et al. |
| 8,493,496 B2 | 7/2013 | Freedman et al. |
| 8,494,252 B2 | 7/2013 | Freedman et al. |
| 8,908,277 B2 | 12/2014 | Pesach et al. |
| 9,036,158 B2 | 5/2015 | Pesach |
| 9,063,283 B2 | 6/2015 | Shpunt et al. |
| 9,066,084 B2 | 6/2015 | Zalevsky et al. |

(Continued)

*Primary Examiner* — Allen C Wong
(74) *Attorney, Agent, or Firm* — Fenwick & West LLP (57) ABSTRACT

A depth camera assembly (DCA) includes a projector, a detector and a controller. The projector emits a tiled structured light (SL) pattern onto a local area. Each illumination source of the projector includes one or more light emitters and an augmented diffractive optical element (ADOE) designed with a pattern mask. The ADOE diffracts at least a portion of light beams emitted from the light emitters to form a first SL pattern projection having a field-of-view corresponding to a first tileable boundary. The pattern mask prevents projection of light that would otherwise be diffracted outside the first tileable boundary. The first SL pattern projection is combined with at least a second SL pattern projection into the tiled SL pattern illuminating objects in the local area. The detector captures images of the objects illuminated by the SL pattern. The controller determines depth information for the objects using the captured images.

20 Claims, 7 Drawing Sheets

(56) References Cited

U.S. PATENT DOCUMENTS

| | | | |
|---|---|---|---|
| 9,091,413 | B2 | 7/2015 | Petronius et al. |
| 9,098,931 | B2 | 8/2015 | Shpunt et al. |
| 9,131,136 | B2 | 9/2015 | Shpunt et al. |
| 9,366,752 | B2 | 6/2016 | Ruh |
| 9,445,010 | B2 | 9/2016 | Shpunt et al. |
| 9,528,906 | B1 | 12/2016 | Yasovsky et al. |
| 2010/0284082 | A1 | 11/2010 | Shpunt et al. |
| 2011/0075259 | A1 | 3/2011 | Shpunt et al. |
| 2011/0114857 | A1 | 5/2011 | Akerman et al. |
| 2011/0158508 | A1 | 6/2011 | Shpunt et al. |
| 2011/0187878 | A1 | 8/2011 | Mor et al. |
| 2011/0188054 | A1 | 8/2011 | Petronius et al. |
| 2011/0205421 | A1 | 8/2011 | Shpunt et al. |
| 2011/0211044 | A1 | 9/2011 | Shpunt et al. |
| 2012/0182464 | A1 | 7/2012 | Shpunt et al. |
| 2013/0038881 | A1 | 2/2013 | Pesach et al. |
| 2013/0207970 | A1 | 8/2013 | Shpunt et al. |
| 2014/0313519 | A1 | 10/2014 | Shpunt et al. |
| 2014/0376092 | A1 | 12/2014 | Mor |
| 2016/0025993 | A1 | 1/2016 | Mor et al. |
| 2016/0178915 | A1 | 6/2016 | Mor et al. |
| 2016/0197452 | A1 | 7/2016 | Mor |
| 2016/0238855 | A1 | 8/2016 | Kriman et al. |
| 2016/0356484 | A1 | 12/2016 | Sawyer et al. |
| 2018/0061034 | A1* | 3/2018 | Zhao .................. G06T 7/002 |

* cited by examiner

Emit, via at least one illumination source of a depth camera assembly (DCA), a tiled light projection with a wide field-of-view (FOV) onto one or more objects in a local area surrounding some or all of the DCA
510

Capture one or more images of the one or more objects in the local area illuminated by the tiled light projection
520

Determine depth information for the one or more objects in the local area using the one or more images
530

Provide the determined depth information to a console and/or a head-mounted display (HMD)
540

TILEABLE STRUCTURED LIGHT PROJECTION FOR WIDE FIELD-OF-VIEW DEPTH SENSING

BACKGROUND

The present disclosure generally relates to design of a structured light pattern, and specifically relates to generating a tileable structured light projection for wide field-of-view (FOV) depth sensing.

Current solutions for achieving structured light illumination with a wide FOV for depth sensing include an approach based on a single wide FOV diffractive optical element (DOE), an approach based on a dual DOE, and an approach based on tiling multiple projectors with projection distortion. However, each of these solutions has its own disadvantages. For example, the approach based on a single wide FOV DOE suffers a relative large zero-order value compared to other diffraction orders. The large zero-order value can lead to issues in laser safety compliance and algorithm performance. Also, the large pincushion like distortion in the light projection causes inefficient use of a projector power. For the approach based on the single DOE for achieving wide FOV, the zero-order value is largely limited by a process error, such as the depth etching error. For example, a depth etching error of 2% leads to a zero-order value of approximately 0.1%. Achieving lower zero-order values than 0.1% based on the single wide FOV DOE means low yield and high price for fabricating a DOE.

The approach based on dual DOE that utilizes a tile DOE and a tiler DOE can further reduce the zero-order value by tiling a light pattern generated by the tile DOE to fill the entire FOV. The zero-order value of the tile DOE can be effectively reduced by a factor equal to a number of tiling projections. For example, 3×3 tiling provides effective reduction of the zero-order value by the factor of nine. However, the approach based on dual DOE increases the DOE complexity and cost, while still having an issue with pincushion distortion. The approach based on dual DOE also restricts the space of achievable pattern to the one that repeats across the field which results in additional algorithmic complexity.

The DOE-based structured light projection suffers intrinsic distortion (i.e., the pincushion like distortion) due to the law of diffraction, which increases rapidly as FOV increases. The intrinsic distortion causes overlapping of light patterns and/or voids (i.e., gaps in light patterns) when tiling multiple light projections to achieve wider FOV illumination, which leads to increased complexity of depth sensing algorithms and less efficient use of a projector power. A simple tileable projection shape is a rectangular or square shape. For achieving such a rectangular or square shape of light projection, the rectangular design pattern can be shaped on finer grids (e.g., each grid corresponding to a diffraction order) such that the projected light pattern exhibits desired rectangular shape after illuminating a DOE designed with the re-shaped rectangular light pattern. However, the distortion pre-compensation approach uses more diffraction orders in DOE design and demands more advanced fabrication process, leading to a higher price.

SUMMARY

Embodiments of the present disclosure support a depth camera assembly (DCA). The DCA includes at least one illumination source, a detector and a controller. The at least one illumination source is configured to emit a structured light (SL) pattern onto one or more objects in a local area. The illumination sources of the DCA emit light that are diffracted by one or more augmented diffractive optical elements (ADOEs) to form corresponding SL patterns (also referred to as SL pattern projections). An ADOE is a diffractive optical element that is designed to diffract light into a SL pattern projection that has a field-of-view (FOV) corresponding to a tiling boundary (e.g., rectangular, hexagonal, square, etc.). The ADOE prevents projection of portions of the SL pattern that would otherwise lie outside the tiling boundary. In some embodiments, the ADOE is designed by, e.g., masking a design pattern such that light diffracted from the ADOE is within a FOV that is bounded by the tiling boundary, and then proceeding with a normal lithography process to form a diffractive element. The purpose of masking is to not project portions of the SL pattern that would lie outside a desired tiling boundary.

The ADOE is illuminated with at least a portion of light beams emitted from light emitters of the illumination source. The ADOE generates a SL pattern that is projected into the local area, forming a SL pattern projection. The generated SL pattern projection is combined with at least one other SL pattern projection into a tiled light projection. Two or more ADOEs can be physically arranged so that emitted SL patterns appear in a space as if the SL patterns were coming from the same origin, i.e., angular separations between the generated SL patterns does not depend on a distance between ADOEs. The tiled light projection represents the SL pattern that illuminates the one or more objects in the local area achieving a wide FOV without distortions. The detector of the DCA is configured to capture one or more images of the one or more objects in the local area illuminated by the tiled light projection. The controller of the DCA is configured to determine depth information for the one or more objects in the local area using the one or more images.

Embodiments of the present disclosure further support a head-mounted display (HMD) that integrates the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA.

Embodiments of the present disclosure further support a station separate from a HMD, wherein the ADOE is part of an illumination source of a DCA integrated into the station. The station may be a console or some other device interfaced (through a wired or wireless connection) with the HMD. The station can perform three-dimensional depth sensing of an environment surrounding some or all of the station including a user wearing the HMD. The station may provide the depth information to the HMD, e.g., for presentation to the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Structured light (SL) illumination (also referred to as SL pattern projection) with a wide field-of-view (FOV) is crucial for achieving wide FOV depth sensing of target objects. Disclosed embodiments include a method and apparatus for achieving an efficient wide FOV illumination by tiling multiple SL pattern projections. Each SL pattern projection is associated with a high-performing rectangular FOV pattern projection (or, alternatively, hexagonal, square, etc.) obtained based on one or more diffractive optical elements.

Disclosed embodiments include a depth camera assembly (DCA) for determining depth information of one or more objects in a local area. The DCA includes one or more SL sources, a detector, and a controller. Each SL source integrated into the DCA emits a SL pattern projection into the local area. The SL source includes an augmented diffractive optical element (ADOE) illuminated with a plurality of light emitters of the SL source. An ADOE is a diffractive optical element that is designed to diffract light into a SL pattern projection that has a FOV corresponding to a tiling boundary (e.g., rectangular, hexagonal, square, etc.). The ADOE is designed to prevent projection of portions of the SL pattern projection that would otherwise lie outside the tiling boundary, which also saves energy of the SL source. Each ADOE in the DCA generates a SL pattern projection that is projected into the local area in a tileable manner. One or more ADOEs in the DCA are designed such that they generate a tiled light projection which can be easily tiled with other similar projections. The angular spacing between features in each ADOE is constant—and they generally have a barrel shaped boundary that cuts off what would otherwise result in the light projection having a shape that is not easily tileable (e.g., pincushion). The detector of the DCA captures one or more images of the local area illuminated with tiled light projections. The controller of the DCA determines depth information for objects in the local area using the one or more images. In some embodiments, two or more ADOE structures are printed on the same substrate. Functionally, the ADOEs printed on the same substrate are equivalent to multiple physically separated ADOEs. However, physically, the ADOEs printed on the same substrate represent a single part, which simplifies manufacturability.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD may further include an electronic display and an optical assembly. The electronic display is configured to emit image light. The optical assembly is configured to direct the image light to an exit pupil of the HMD corresponding to a location of a user's eye, the image light comprising the depth information of the one or more objects in the local area determined by the DCA.

In some embodiments, the DCA with the ADOE is integrated into a station separate from a HMD. In one embodiment, the station is a console interfaced through a wired connection to a HMD. In an alternate embodiment, the station is a base station that wirelessly communicates with the HMD. The DCA of the station captures data describing depth information in an environment surrounding some or all of the station including a user wearing the HMD. The station may provide the depth information to the HMD, which is presented as content to the user.

Figure 1:
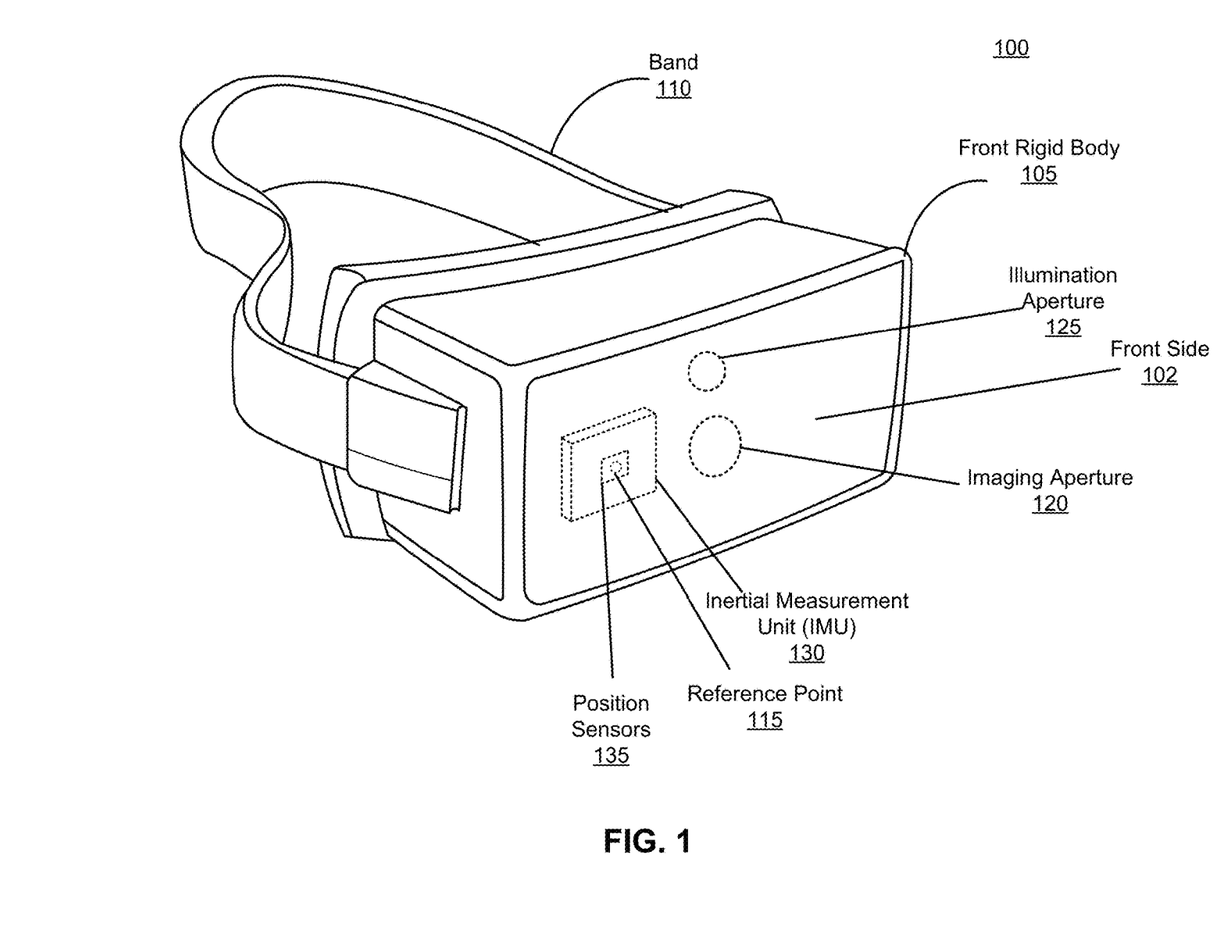
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 shown in FIG. 1 also includes a DCA configured to determine depth information of a local area surrounding some or all of the HMD 100. The HMD also includes an imaging aperture 120 and an illumination aperture 125, and an illumination source of the DCA emits light through the illumination aperture 125. And an imaging device of the DCA captures light from the illumination source that is reflected/scattered from the local area through the imaging aperture 120. Light emitted from the illumination source of the DCA through the illumination aperture 125 comprises a SL pattern, as discussed in more detail in conjunction with FIGS. 2, 3A-3C and 4A-4B.

In one embodiment, the front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
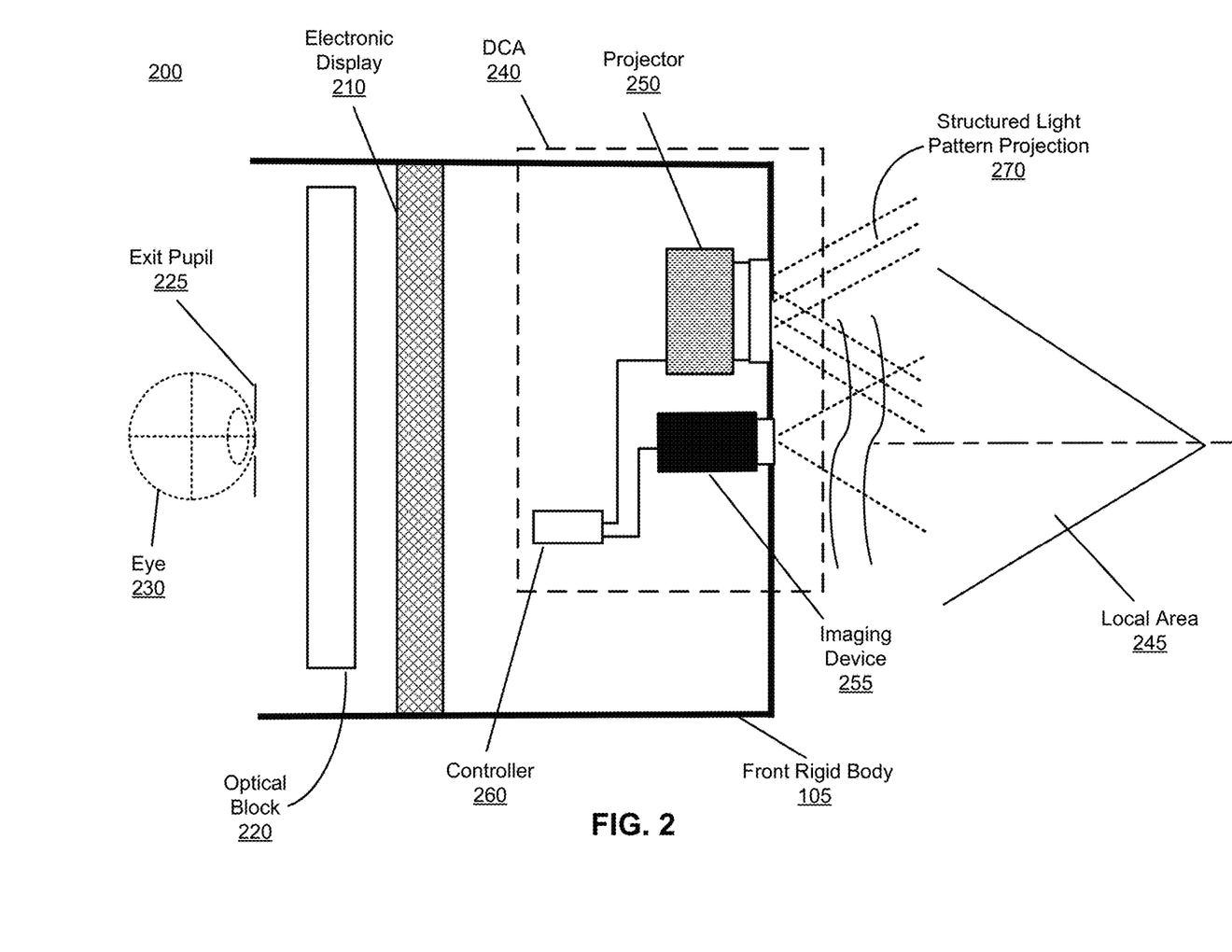
FIG. 2 is a cross section of a front rigid body of the HMD in FIG. 1 that includes a depth camera assembly (DCA), in accordance with an embodiment.

FIG. 2 is a cross section 200 of the front rigid body 105 of the embodiment of the HMD 100 shown in FIG. 1. As shown in FIG. 2, the front rigid body 105 includes an electronic display 210 and an optical block 220 that together provide image light to an exit pupil 225. The exit pupil 225 is the location of the front rigid body 105 where a user's eye 230 is positioned. For purposes of illustration, FIG. 2 shows a cross section 200 associated with a single eye 230, but another optical block 220, separate from the optical block 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical block 220 magnifies received light from the electronic display 210, corrects optical aberrations associated with the image light, and the corrected image light is presented to a user of the HMD 100. At least one optical element of the optical block 220 may be an aperture, a Fresnel lens, a refractive lens, a reflective surface, a diffractive element, a waveguide, a filter, or any other suitable optical element that affects the image light emitted from the electronic display 210. Moreover, the optical block 220 may include combinations of different optical elements. In some embodiments, one or more of the optical elements in the optical block 220 may have one or more coatings, such as anti-reflective coatings, dichroic coatings, etc. Magnification of the image light by the optical block 220 allows elements of the electronic display 210 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical block 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a projector 250, an imaging device 255, and a controller 260 that may be coupled to both the projector 250 and the imaging device 255. The projector 250 comprises one or more illumination sources, each emitting a SL pattern projection into at least a portion of the local area 245. An illumination source of the projector 250 may be composed of a plurality of laser-type light emitters on a single substrate configured to simultaneously emit a plurality of light beams in the form of a SL pattern projection. The illumination source of the projector 250 emits the plurality of light beams that are diffracted by an ADOE placed in front of the light emitters to form a corresponding SL pattern projection 270. An ADOE is a diffractive optical element that is modified to diffract light emitted from an associated illumination source into a SL pattern projection 270 that has a FOV corresponding to a tiling boundary of a suitable shape (e.g., rectangular, hexagonal, square, etc.). The ADOE is designed to prevent projection of portions of the SL pattern projection 270 that would otherwise lie outside the tiling boundary. In some embodiments, a pattern of the ADOE is designed with a pattern mask to prevent projection of portions of the SL pattern projection 270 that would lie outside a desired tiling boundary. The SL pattern projection 270 with FOV corresponding to the tiling boundary can be combined with at least one other SL pattern projection 270 generated by the projector 250 into a tiled light projection that illuminates the local area 245 with a wide FOV. The tiled light projection represents a SL pattern that illuminates one or more object in the local area 245 achieving a wide FOV while mitigating distortions, as discussed in more detail in conjunction with FIGS. 4A-4B. The controller 260 coupled to the projector 250 may provide emission instructions to the one or more illumination sources of the projector 250 for controlling operations of the one or more illumination sources. In some embodiments, the controller 260 controls light intensity emitted from each illumination source of the projector 250, modulation of light emitted from each illumination source, time duration when each illumination source is activated, etc. The imaging device 255 captures one or more images of the one or more objects in the local area 245 illuminated by the tiled light projection. The controller 260 is further configured to determine depth information for the one or more objects in the local area 245 using the one or more images captured by the imaging device 255. In some embodiments, the controller 260 provides the determined depth information to a console (not shown in FIG. 2) and/or an appropriate module of the HMD 100 (e.g., a varifocal module). The console and/or the HMD 100 may utilize the depth information to, e.g., generate content for presentation on the electronic display 210.

In some embodiments, the front rigid body 105 further comprises an eye tracking system (not shown in FIG. 2) that determines eye tracking information for the user's eye. The determined eye tracking information may comprise information about an orientation of the user's eye in an eye-box, i.e., information about an angle of an eye-gaze. In one embodiment, the user's eye is illuminated with a SL pattern. Then, the eye tracking system can use locations of the reflected SL pattern in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical block 220 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3A:
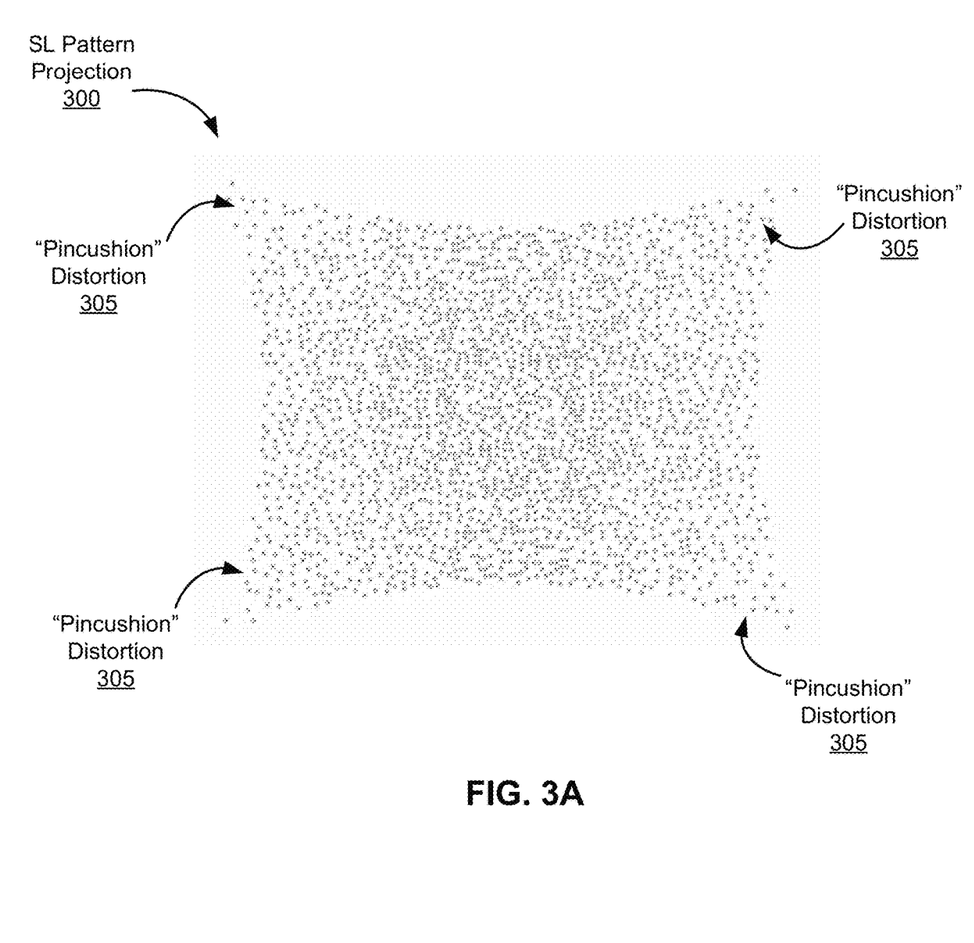
FIG. 3A illustrates a diffractive optical element (DOE) based structured light (SL) pattern projection with distortion, in accordance with an embodiment.
Figure 3B:
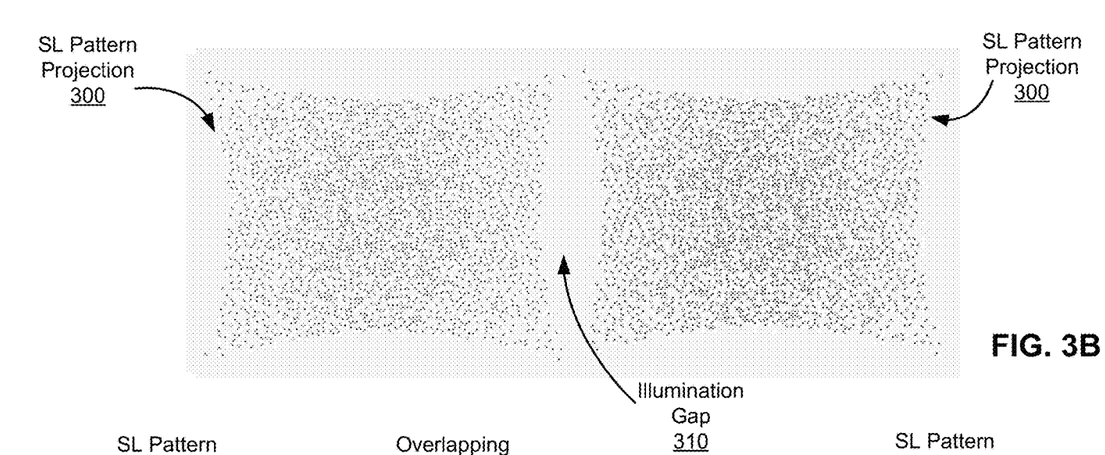
FIG. 3B illustrates non-ideal tiling of two DOE based SL pattern projections with distortion causing an illumination gap, in accordance with an embodiment.
Figure 3C:
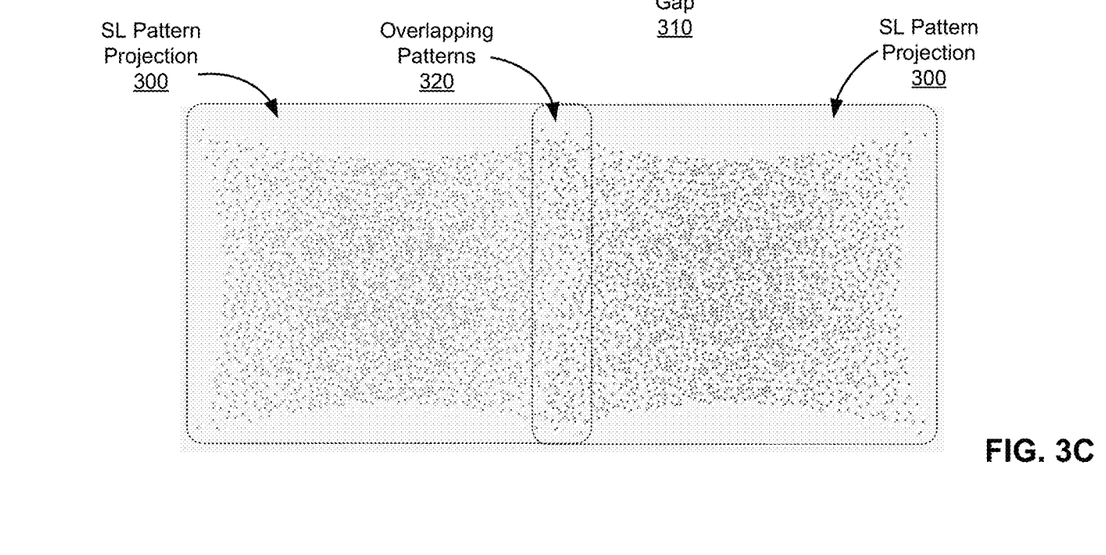
FIG. 3C illustrates non-ideal tiling of two DOE based SL pattern projections with distortion causing overlapping light patterns, in accordance with an embodiment.

FIG. 3A illustrates a diffractive optical element (DOE) based SL pattern projection 300, in accordance with an embodiment. The DOE based SL pattern projection 300 features intrinsic distortion due to the law of diffraction, i.e., pincushion like distortions 305 as shown in FIG. 3A. Note that each dot in the SL pattern projection 300 corresponds to one or more light beams emitted from one or more laser-type light emitters of an illumination source included in a DCA. The intrinsic kind of distortion due to the law of diffraction increases as FOV increases, causing that the DOE based SL pattern projection 300 is not suitable for tiling with other similar light projections for achieving wide FOV illumination. As shown in FIG. 3B, the pincushion like distortions 305 in the DOE based SL pattern projection 300 may cause an illumination gap (void) 310 when tiling multiple SL pattern projections 300 to achieve wider FOV illumination. As further shown in FIG. 3C, the pincushion like distortions 305 in the DOE based SL pattern projection 300 may also cause overlapping light patterns 320 when tiling multiple SL pattern projections 300 to achieve wider FOV illumination. The illumination gap 310 in FIG. 3B and the overlapping patterns 320 in FIG. 3C lead to increased complexity of depth sensing algorithms and less efficient use of a projector power.

Figure 4A:
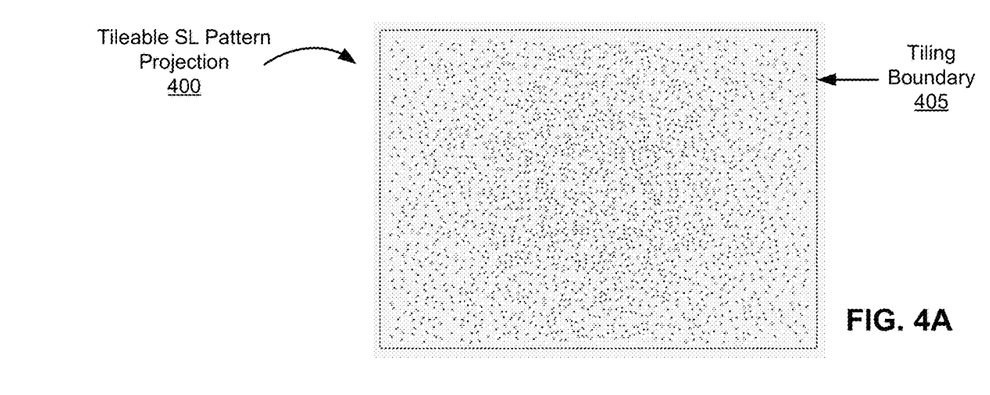
FIG. 4A illustrates an augmented DOE (ADOE) based SL pattern projection that mitigates distortion, in accordance with an embodiment.

FIG. 4A illustrates an ADOE based SL pattern projection 400 where the pincushion like distortions 305 shown in FIG. 3A are mitigated, in accordance with an embodiment. In the illustrative embodiment shown in FIG. 4A, an illumination source with an ADOE integrated into the projector 250 of the DCA 240 in FIG. 2 generates the ADOE based SL pattern projection 400, which provides a tiling boundary 405 of rectangular shape for illumination of at least a portion of a local area. Note that each dot in the ADOE based SL pattern projection 400 corresponds to one or more light beams emitted from one or more laser-type light emitters of the illumination source. In some embodiments, the projector 250 comprises at least one illumination source, each illumination source including a plurality of laser-type light emitters on a single substrate configured to simultaneously emit a plurality of light beams in the form of a SL pattern (e.g., a collimated laser beam) that illuminates the local area 245. In alternate embodiments, an illumination source with an ADOE of the projector 250 generates the ADOE based SL pattern projection 400 having some other type of tiling boundary, such as hexagonal, square, etc. (not shown in FIG. 4A). The ADOE placed in front of the light emitters is configured to prevent projection of portions of the SL pattern projection 400 that would otherwise lie outside the tiling boundary 405 causing distortions. Thus, the generated ADOE based SL pattern projection 400 having the tiling boundary 405 of rectangular shape facilitates tiling of multiple SL pattern projections 400 for achieving wide FOV illumination without distortions which is suitable for accurate depth sensing.

The tileable ADOE based SL pattern projection 400 shown in FIG. 4A is therefore generated based on the ADOE fabricated by trimming its design pattern. The ADOE is designed as a DOE with a modified (masked) pattern obtained by applying a pattern mask to modify an original design bitmap such that the ADOE diffracts an incident light to form a structured illumination that has a tileable boundary. The pattern mask of the ADOE prevents projection of light emitted from the illumination source of the projector 250 that would otherwise cause the pincushion like distortions 305 shown in FIG. 3A in order to obtain the SL pattern projection 400. Thus, the ADOE includes a DOA that is designed (augmented) with the pattern mask, which prevents projection of light that would otherwise lie outside the tiling boundary. The pattern mask used in the ADOE does not affect light beams that lie within the tiling boundary after being diffracted by the DOA of the ADOE. The ADOE designed with such masked pattern generates, under a collimated laser beam, a SL pattern projection having a FOV corresponding to the tiling boundary of a specific type suitable for tiling multiple SL pattern projections (e.g., rectangular, hexagonal, square, etc.) to achieve a wide FOV for improved depth sensing.

In some embodiments, the formula used to create the appropriate masked pattern for design into the ADOE and preventing projection of specific light that would otherwise lie outside a tiling boundary is given below for generating a SL pattern projection with a rectangular FOV of size $\theta_h$ degree×$\theta_v$ degree:

$$M(i_h, i_v) = \begin{cases} 1, & |(i_h - (n_h + 1))\sin(\alpha_h)| \le \sin\left(\frac{\theta_h}{2}\right) \text{ AND } |(i_v - (n_v + 1))\sin(\alpha_v)| \le \sin\left(\frac{\theta_v}{2}\right) \\ 0, & \text{otherwise} \end{cases} \quad (1)$$

where $\theta_h$ is an angular field of view in horizontal direction, $\theta_v$ is an angular field of view in vertical direction, $1 \le i_h \le 2n_h + 1$, $1 \le i_v \le 2n_v + 1$, $(2n_h+1) \times (2n_v+1)$ is a size of the original design pattern bitmap, $i_h$ is an integer that represents a horizontal coordinate in the design pattern bitmap, $i_v$ is an integer that represents a vertical coordinate in the design pattern bitmap, $n_h$ is an integer that represents an index in horizontal direction of the design pattern bitmap, $n_v$ is an integer that represents an index in vertical direction of the design pattern bitmap, $M(i_h, i_v)$ is a normalized intensity of an emitted light beam in a position $(i_h, i_v)$ in the design pattern bitmap after being diffracted by the ADOE, $\alpha_h$ is a diffraction order separation in horizontal direction, and $\alpha_v$ is a diffraction order separation in vertical direction. In some embodiments, the ADOE based SL pattern projection 400 shown in FIG. 4A is obtained based on diffraction of light by an ADOE having a masked pattern designed based on equation (1).

Figure 4B:
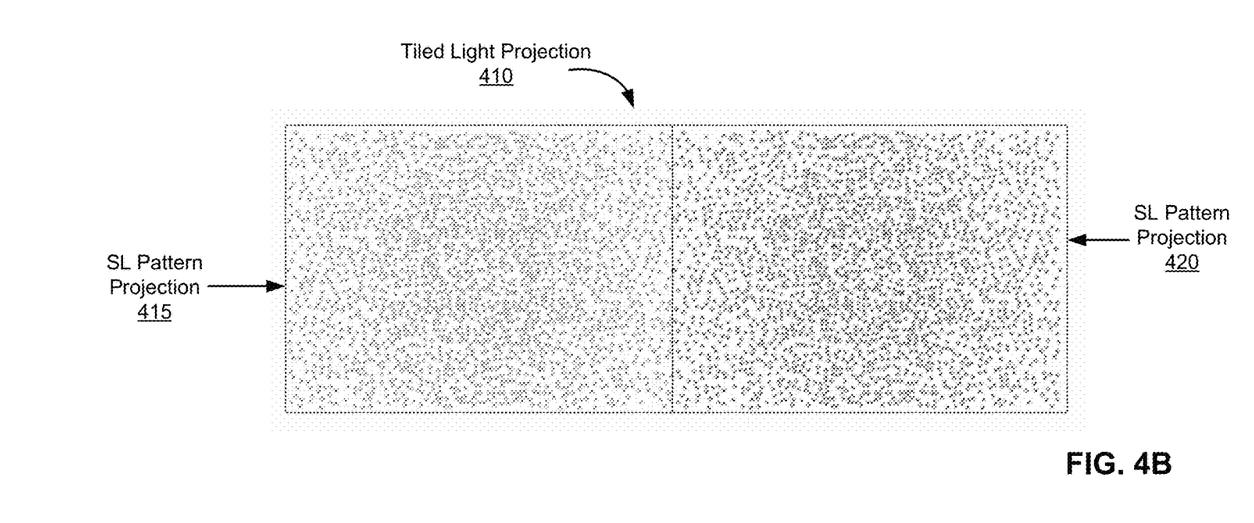
FIG. 4B illustrates tiling of multiple ADOE based SL pattern projections that mitigate distortion, in accordance with an embodiment.

FIG. 4B illustrates a tiled ADOE based SL pattern projection 410, in accordance with an embodiment. The tiled ADOE based SL pattern projection 410 is obtained by tiling an ADOE based SL pattern projection 415 and an ADOE based SL pattern projection 420. In some embodiments, the ADOE based SL pattern projections 415, 420 are generated by at least one illumination source emitting light that illuminates at least one ADOE, each ADOE having a masked pattern designed in accordance with equation (1) to prevent projection of light that would otherwise lie outside a tiling boundary. In one embodiment, the tileable ADOE based SL pattern projections 415, 420 are simultaneously generated by a pair of illumination sources included in the projector 250 of the DCA 240 in FIG. 2 and a pair of ADOEs with a masked pattern designed based on equation (1). In this case, the projector 250 spatially multiplexes the SL pattern projections 415, 420 to form the tiled SL pattern projection 410 with a FOV wider than a FOV of an individual SL pattern projection 415, 420. In an alternate embodiment, a single illumination source and an ADOE with a masked pattern designed based on equation (1) are integrated into the projector 250 of the DCA 240 to generate each tileable SL pattern projection 415, 420 in a particular time instant. In this case, the projector 250 time-multiplexes the SL pattern projections 415, 420 to form the tiled SL pattern projection 410 with a wide FOV. As shown in FIG. 4B, the tiled SL pattern projection 410 provides a wide FOV for depth sensing of target objects, without any pincushion like distortions, illumination voids (gaps) and overlapping patterns shown in FIGS. 3A-3C.

One advantage of the described approach for obtaining a tiled SL pattern projection with a wide FOV is a simple manipulation of light pattern to generate a desired shape of FOV, such as rectangular, square, hexagonal, etc. Another advantage is that there are no added challenges to design and fabrication of an ADOE that generates a tileable SL pattern projection that lies within a tiling boundary. Yet another advantage is that illumination sources of the projector 250 of the DCA 240 that generate different tileable SL pattern projections can efficiently operate at different wavelengths. An appropriate band-pass filter can be then applied in front of the imaging device 255 that captures SL pattern reflected from the local area 245. This particular arrangement has the benefit of relaxed mechanical design for mounting the illumination sources in the projector 250, while still achieving efficient power usage in the tiled wider FOV.

Figure 5:
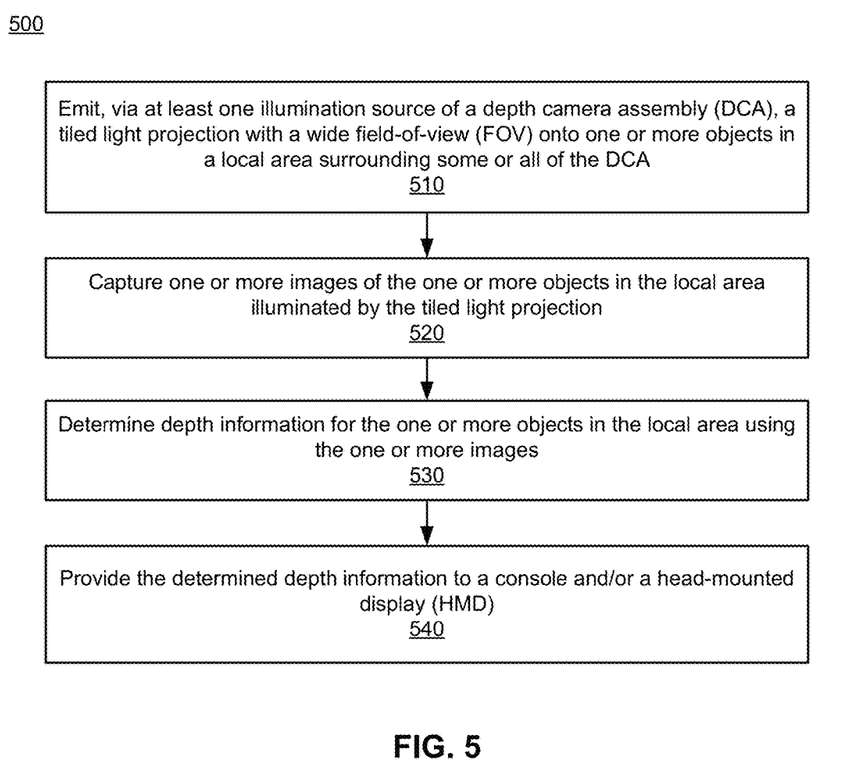
FIG. 5 is a flow chart illustrating a process of generating a tileable SL pattern projection for wide field-of-view (FOV) depth sensing, which may be implemented at the HMD shown in FIG. 1, in accordance with an embodiment.

FIG. 5 is a flow chart illustrating a process 500 of using tileable SL pattern projection for wide FOV depth sensing, which may be implemented at the HMD 100 shown in FIG. 1, in accordance with an embodiment. The process 500 of FIG. 5 may be performed by the components of a DCA (e.g., the DCA 240). Other entities (e.g., a HMD and/or console) may perform some or all of the steps of the process in other embodiments. Likewise, embodiments may include different and/or additional steps, or perform the steps in different orders.

The DCA emits 510 (e.g., via a projector of the DCA) a tiled light projection with a wide FOV onto one or more objects in a local area surrounding some or all of the DCA. In some embodiments, each illumination source of the DCA includes an ADOE designed with a pattern mask that prevents projection of light that would otherwise lie outside a tiling boundary (e.g., rectangular, hexagonal, square, etc.). Designing the ADOE with the pattern mask results into the ADOE with the masked pattern. The ADOE with the masked pattern generates a first SL pattern projection having a first tileable boundary, wherein the first SL pattern projection can be combined with at least one a second SL pattern projection having a second tileable boundary of the same shape as the first tileable boundary. The first SL pattern projection and the at least second SL pattern projection are combined into the tiled light projection illuminating the one or more objects in the local area. In some embodiments, the first SL pattern projection is at a first range of wavelengths and the second SL pattern projection is at a second range of wavelengths that are different from the first range.

In some embodiments, the DCA comprises a second ADOE configured to diffract some portion of light beams to form the second SL pattern projection, the second SL pattern projection having a FOV corresponding to a second tileable boundary. The second ADOE is designed with a second pattern mask that prevents projection of light that would otherwise be diffracted into an area outside of the second tileable boundary. The DCA is then configured to generate the tiled light projection by spatially-multiplexing illumination of a first portion of the local area with the first SL pattern projection and illumination of a second portion of the local area that is adjacent to the first portion with the second SL pattern projection. In alternate embodiments, the DCA is configured to generate the tiled light projection by time-multiplexing illumination of a first portion of the local area with the first SL pattern projection and illumination of a second portion of the local area that is adjacent to the first portion with the second SL pattern projection.

The DCA captures 520 (e.g., via an imaging device or a detector of the DCA) one or more images of the one or more objects in the local area illuminated by the tiled light projection. In some embodiments, the detector comprises a plurality of band-pass filters configured to process light of the first range of wavelengths and the second range of wavelengths reflected from the one or more objects in the local area.

The DCA determines 530 (e.g., via a controller of the DCA) depth information for the one or more objects in the local area using the one or more images.

The DCA provides 540 the determined depth information to a console and/or a HMD. The console and/or the HMD may utilize the depth information to, e.g., generate content for presentation to a user of the HMD.

System Environment

Figure 6:
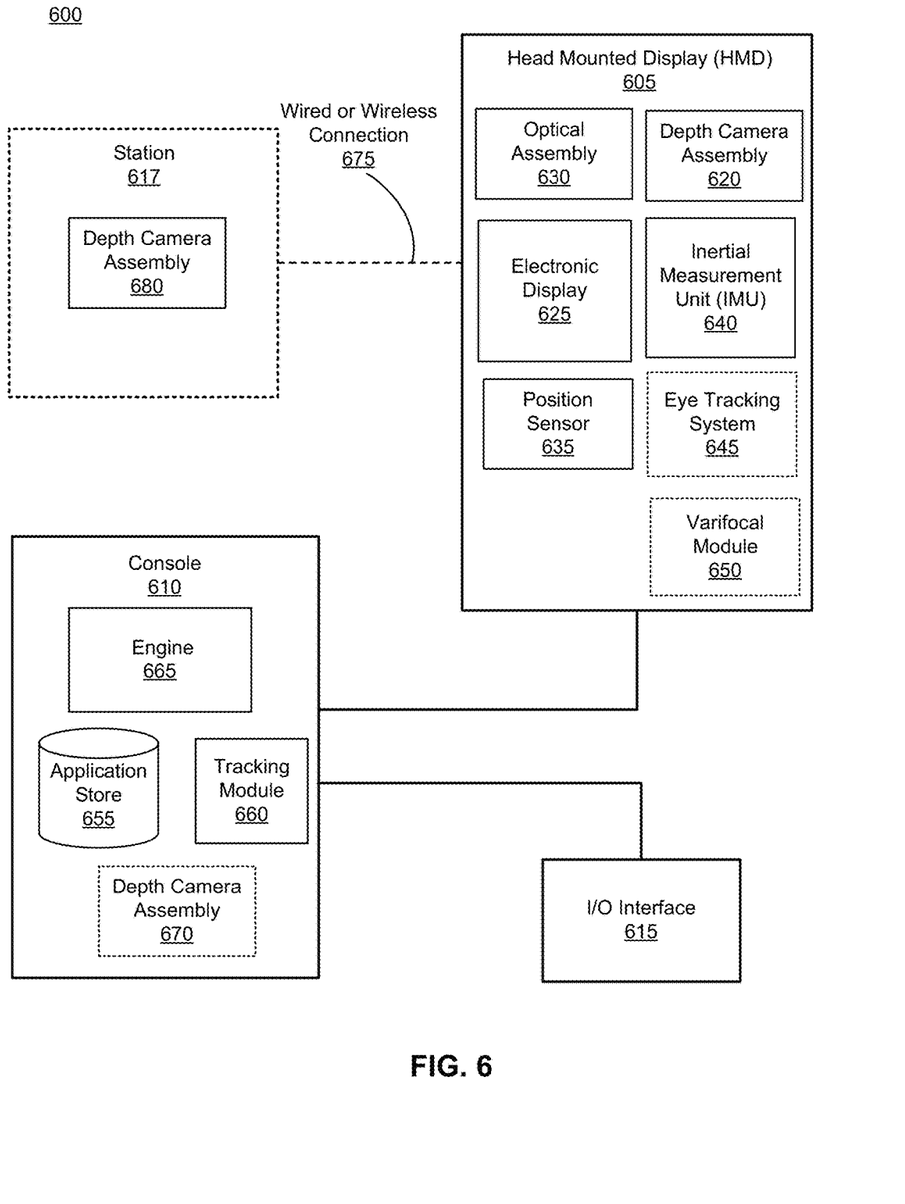
FIG. 6 is a block diagram of a system environment that includes the HMD shown in FIG. 1, in accordance with an embodiment.

FIG. 6 is a block diagram of one embodiment of a HMD system 600 in which a console 610 operates. The HMD system 600 may operate in a VR system environment, an AR system environment, a MR system environment, or some combination thereof. The HMD system 600 shown by FIG. 6 comprises a HMD 605 and an input/output (I/O) interface 615 that is coupled to the console 610. Optionally, the HMD system comprises a station 617 (e.g., base station) separate from the HMD 605 and the console 610. While FIG. 6 shows an example HMD system 600 including one HMD 605 and on I/O interface 615, in other embodiments any number of these components may be included in the HMD system 600. For example, there may be multiple HMDs 605 each having an associated I/O interface 615, with each HMD 605 and I/O interface 615 communicating with the console 610. In alternative configurations, different and/or additional components may be included in the HMD system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the HMD 605.

The HMD 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 605, the console 610, or both, and presents audio data based on the audio information. The HMD 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 605 is the HMD 100 described above in conjunction with FIG. 1.

The HMD 605 includes a DCA 620, an electronic display 625, an optical assembly 630, one or more position sensors 635, an IMU 640, an optional eye tracking system 645, and an optional varifocal module 650. Some embodiments of the HMD 605 have different components than those described in conjunction with FIG. 6. Additionally, the functionality provided by various components described in conjunction with FIG. 6 may be differently distributed among the components of the HMD 605 in other embodiments.

The DCA 620 captures data describing depth information of an area surrounding some or all of the HMD 605. The DCA 620 can compute the depth information using the data (e.g., based in part on deformation of the SL pattern and/or time-of-flight techniques), or the DCA 620 can send this information to another device such as the console 610 that can determine the depth information using data from the DCA 620.

The DCA 620 includes at least one illumination source, an imaging device (detector), and a controller. The DCA 620 is an embodiment of the DCA 240 in FIG. 2. The at least one illumination source of the DCA 620 is configured to emit a SL pattern projection onto an area surrounding some or all of the HMD 605. The at least one illumination source of the DCA 620 may include a plurality of laser-type emitters on a single substrate. As discussed above in conjunction with FIGS. 2, 4A-4B, the illumination sources of the DCA 620 emit light that are diffracted by one or more ADOEs to form corresponding SL pattern projections, each SL pattern projection having a FOV corresponding to a tiling boundary (e.g., rectangular, hexagonal, square, etc.). The ADOE prevents projection of portions of the SL pattern projection that would otherwise lie outside the tiling boundary. In some embodiments, the ADOE is formed by, e.g., masking a design pattern such that light diffracted from the ADOE is within a FOV that is bounded by the tiling boundary, and then proceeding with a normal lithography process to form a diffractive element. The purpose of the masked pattern is to not project portions of the SL pattern projection that would lie outside a desired tiling boundary. The DCA 620 combines the generated SL pattern projection with at least one other SL pattern projection into a tiled light projection. The tiled light projection represents the SL pattern that illuminates one or more objects in the local area achieving a wide FOV without distortions. The detector of the DCA 620 is configured to capture one or more images of the one or more objects in the local area illuminated by the tiled light projection. The controller of the DCA 620 is configured to determine depth information for the one or more objects in the local area using the one or more images.

The illumination source of the DCA 620 includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the illumination source can emit light having a SL pattern.

The electronic display 625 displays 2D or 3D images to the user in accordance with data received from the console 610. In various embodiments, the electronic display 625 comprises a single electronic display or multiple electronic displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 630 magnifies image light received from the electronic display 625, corrects optical errors associated with the image light, and presents the corrected image light to a user of the HMD 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the electronic display 625 to be physically smaller, weigh less and consume less power than larger displays. Additionally, magnification may increase the field of view of the content presented by the electronic display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 625 for display is pre-distorted, and the optical assembly 630 corrects the distortion when it receives image light from the electronic display 625 generated based on the content.

The IMU 640 is an electronic device that generates data indicating a position of the HMD 605 based on measurement signals received from one or more of the position sensors 635 and from depth information received from the DCA 620. A position sensor 635 generates one or more measurement signals in response to motion of the HMD 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the HMD 605 relative to an initial position of the HMD 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the HMD 605 from the sampled data. For example, the IMU 640 integrates the measurement signals received from the accelerometers over time to estimate a velocity vector and integrates the velocity vector over time to determine an estimated current position of a reference point on the HMD 605. Alternatively, the IMU 640 provides the sampled measurement signals to the console 610, which interprets the data to reduce error. The reference point is a point that may be used to describe the position of the HMD 605. The reference point may generally be defined as a point in space or a position related to the HMD's 605 orientation and position.

The IMU 640 receives one or more parameters from the console 610. The one or more parameters are used to maintain tracking of the HMD 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the HMD 605, the IMU 640 may be a dedicated hardware component. In other embodiments, the IMU 640 may be a software component implemented in one or more processors.

In some embodiments, the eye tracking system 645 is integrated into the HMD 605. The eye tracking system 645 determines eye tracking information associated with an eye of a user wearing the HMD 605. The eye tracking information determined by the eye tracking system 645 may comprise information about an orientation of the user's eye, i.e., information about an angle of an eye-gaze. In some embodiments, the eye tracking system 645 is integrated into the optical assembly 630. An embodiment of the eye-tracking system 645 may comprise an illumination source and an imaging device (camera).

In some embodiments, the varifocal module 650 is further integrated into the HMD 605. The varifocal module 650 may be coupled to the eye tracking system 645 to obtain eye tracking information determined by the eye tracking system 645. The varifocal module 650 may be configured to adjust focus of one or more images displayed on the electronic display 625, based on the determined eye tracking information obtained from the eye tracking system 645. The varifocal module 650 can be interfaced (e.g., either mechanically or electrically) with at least one of the electronic display 625 and at least one optical element of the optical assembly 630. Then, the varifocal module 650 may be configured to adjust focus of the one or more images displayed on the electronic display 625 by adjusting position of at least one of the electronic display 625 and the at least one optical element of the optical assembly 630, based on the determined eye tracking information obtained from the eye tracking system 645. By adjusting the position, the varifocal module 650 varies focus of image light output from the electronic display 625 towards the user's eye. The varifocal module 650 may be also configured to adjust resolution of the images displayed on the electronic display 625 by performing foveated rendering of the displayed images, based at least in part on the determined eye tracking information obtained from the eye tracking system 645. In this case, the varifocal module 650 provides appropriate image signals to the electronic display 625. The varifocal module 650 provides image signals with a maximum pixel density for the electronic display 625 only in a foveal region of the user's eye-gaze, while providing image signals with lower pixel densities in other regions of the electronic display 625.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the HMD 605 for processing in accordance with information received from one or more of: the DCA 620, the HMD 605, and the I/O interface 615. In the example shown in FIG. 6, the console 610 includes an application store 655, a tracking module 660, an engine 665, and an optional DCA 670. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the HMD 605 or the I/O interface 615. Examples of applications include: gaming applications, conferencing applications, video playback applications, or other suitable applications.

The tracking module 660 calibrates the HMD system 600 using one or more calibration parameters and may adjust one or more calibration parameters to reduce error in determination of the position of the HMD 605 or of the I/O interface 615. For example, the tracking module 660 communicates a calibration parameter to the DCA 620 to adjust the focus of the DCA 620 to more accurately determine positions of SL elements captured by the DCA 620. Calibration performed by the tracking module 660 also accounts for information received from the IMU 640 in the HMD 605 and/or an IMU 640 included in the I/O interface 615. Additionally, if tracking of the HMD 605 is lost (e.g., the DCA 620 loses line of sight of at least a threshold number of SL elements), the tracking module 660 may re-calibrate some or all of the HMD system 600.

The tracking module 660 tracks movements of the HMD 605 or of the I/O interface 615 using information from the DCA 620, the one or more position sensors 635, the IMU 640 or some combination thereof. For example, the tracking module 660 determines a position of a reference point of the HMD 605 in a mapping of a local area based on information from the HMD 605. The tracking module 660 may also determine positions of the reference point of the HMD 605 or a reference point of the I/O interface 615 using data indicating a position of the HMD 605 from the IMU 640 or using data indicating a position of the I/O interface 615 from an IMU 640 included in the I/O interface 615, respectively. Additionally, in some embodiments, the tracking module 660 may use portions of data indicating a position or the HMD 605 from the IMU 640 as well as representations of the local area from the DCA 620 to predict a future location of the HMD 605. The tracking module 660 provides the estimated or predicted future position of the HMD 605 or the I/O interface 615 to the engine 665.

The engine 665 generates a 3D mapping of the area surrounding some or all of the HMD 605 (i.e., the "local area") based on information received from the HMD 605. In some embodiments, the engine 665 determines depth information for the 3D mapping of the local area based on information received from the DCA 620 that is relevant for techniques used in computing depth. The engine 665 may calculate depth information using one or more techniques in computing depth from SL. In various embodiments, the engine 665 uses the depth information to, e.g., update a model of the local area, and generate content based in part on the updated model.

The engine 665 also executes applications within the HMD system 600 and receives position information, acceleration information, velocity information, predicted future positions, or some combination thereof, of the HMD 605 from the tracking module 660. Based on the received information, the engine 665 determines content to provide to the HMD 605 for presentation to the user. For example, if the received information indicates that the user has looked to the left, the engine 665 generates content for the HMD 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the HMD 605 or haptic feedback via the I/O interface 615.

In some embodiments, based on the eye tracking information (e.g., orientation of the user's eye) received from the eye tracking system 645, the engine 665 determines resolution of the content provided to the HMD 605 for presentation to the user on the electronic display 625. The engine 665 provides the content to the HMD 605 having a maximum pixel resolution on the electronic display 625 in a foveal region of the user's gaze, whereas the engine 665 provides a lower pixel resolution in other regions of the electronic display 625, thus achieving less power consumption at the HMD 605 and saving computing cycles of the console 610 without compromising a visual experience of the user. In some embodiments, the engine 665 can further use the eye tracking information to adjust where objects are displayed on the electronic display 625 to prevent vergence-accommodation conflict.

In some embodiments, the DCA 670 is integrated into the console 610, wherein the DCA 670 includes an illumination source with an ADOE. As discussed above, the ADOE is designed as a DOE with a masked pattern obtained by applying a pattern mask to modify an original design bitmap such that the ADOE diffracts an incident light to form a structured illumination that has a tileable boundary. By tiling multiple structured illuminations with tileable boundaries, DCA 670 generates a tiled illumination that illuminates a wide FOV of an environment including a user wearing the HMD 605. An imaging device (camera) of the DCA 670 captures data describing depth information of the environment. A controller of the DCA 670 or the engine 665 may determine the depth information and send the depth information to the HMD 605 for presentation to the user.

In some embodiments, the HMD system 600 further includes the station 617 (e.g., base station) separate from the HMD 605 and the console 610. The station 617 may be interfaced via a wired or wireless connection 675 with the HMD 605. The station 617 includes a DCA 680 with an illumination source coupled to an ADOE (not shown in FIG. 6). As discussed above, the ADOE is designed as a DOE with a masked pattern obtained by applying a pattern mask to modify an original design bitmap such that the ADOE diffracts an incident light to form a structured illumination that has a tileable boundary. By tiling multiple structured illuminations with tileable boundaries, DCA 680 generates a tiled illumination that illuminates a wide FOV of an environment including a user wearing the HMD 605. An imaging device (camera) of DCA 680 captures data describing depth information of the environment. A controller of the DCA 680 may determine the depth information and send, via the wired or wireless connection 675, the determined depth information to the HMD 605 for presentation to the user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a projector configured to emit a tiled structured light (SL) pattern onto one or more objects in a local area, each illumination source of the projector comprising:
a plurality of light emitters that emit a plurality of light beams, and
an augmented diffractive optical element (ADOE) configured to diffract at least a portion of the light beams to form a first SL pattern projection, the first SL pattern projection having a field-of-view (FOV) corresponding to a first tileable boundary, the ADOE being designed with:
a pattern mask that prevents projection of light that would otherwise be diffracted into an area outside of the first tileable boundary,
wherein the first SL pattern projection is combined with at least a second SL pattern projection into the tiled SL pattern illuminating the one or more objects in the local area;
a detector configured to capture one or more images of the one or more objects in the local area illuminated by the tiled SL pattern; and
a controller configured to determine depth information for the one or more objects in the local area using the one or more images.

2. The DCA of claim 1, further comprising:
a second ADOE configured to diffract some portion of the light beams to form the second SL pattern projection, the second SL pattern projection having a FOV corresponding to a second tileable boundary, the second ADOE being designed with a second pattern mask that prevents projection of light that would otherwise be diffracted into an area outside of the second tileable boundary,
wherein the projector is configured to generate the tiled SL pattern by spatially-multiplexing illumination of a first portion of the local area with the first SL pattern and illumination of a second portion of the local area that is adjacent to the first portion with the second SL pattern.

3. The DCA of claim 1, wherein the projector is configured to generate the tiled SL pattern by time-multiplexing illumination of a first portion of the local area with the first SL pattern and illumination of a second portion of the local area that is adjacent to the first portion with the second SL pattern.

4. The DCA of claim 1, wherein the first tileable boundary is rectangular, and the ADOE is designed to generate a pattern for light projection rectangular in shape having a FOV of size $\theta_h$ degree×$\theta_v$ degree defined as:

$$M(i_h, i_v) = \begin{cases} 1, & |(i_h - (n_h + 1))\sin(\alpha_h)| \leq \sin\left(\frac{\theta_h}{2}\right) \text{ AND } |(i_v - (n_v + 1))\sin(\alpha_v)| \leq \sin\left(\frac{\theta_v}{2}\right) \\ 0, & \text{otherwise} \end{cases},$$

where $\theta_h$ is an angular field of view in horizontal direction, $\theta_v$ is an angular field of view in vertical direction, $1 \leq i_h \leq 2n_h+1$, $1 \leq i_v \leq 2n_v+1$, $(2n_h+1)\times(2n_v+1)$ is a size of the original design pattern bitmap, $i_h$ is an integer that represents a horizontal coordinate in the design pattern bitmap, $i_v$ is an integer that represents a vertical coordinate in the design pattern bitmap, $n_h$ is an integer that represents an index in horizontal direction of the design pattern bitmap, $n_v$ is an integer that represents an index in vertical direction of the design pattern bitmap, $M(i_h, i_v)$ is a normalized intensity of an emitted light beam in a position $(i_h, i_v)$ in the design pattern bitmap after being diffracted by the ADOE, $\alpha_h$ is a diffraction order separation in horizontal direction, and $\alpha_v$ is a diffraction order separation in vertical direction.

5. The DCA of claim 1, wherein the first SL pattern projection is at a first range of wavelengths and the second SL pattern projection is at a second range of wavelengths that are different from the first range.

6. The DCA of claim 5, wherein the detector comprises a plurality of band-pass filters configured to process light of the first range of wavelengths and the second range of wavelengths reflected from the one or more objects in the local area.

7. The DCA of claim 1, wherein the DCA comprising the projector, the detector and the controller is part of a head-mounted display (HMD).

8. The DCA of claim 1, wherein the FOV corresponding to the first tileable boundary and the FOV corresponding to the second tileable boundary are the same size.

9. The DCA of claim 1, wherein:
the controller is further configured to provide the determined depth information to a console; and the console is configured to generate content for presentation on an electronic display of a head-mounted display (HMD), based on the depth information.

10. A head-mounted display (HMD) comprising:
an electronic display configured to emit image light;
a depth camera assembly (DCA) comprising:
a projector configured to emit a tiled structured light (SL) pattern onto one or more objects in a local area, each illumination source of the projector comprising:
a plurality of light emitters that emit a plurality of light beams, and an augmented diffractive optical element (ADOE) configured to diffract at least a portion of the light beams to form a first SL pattern projection, the first SL pattern projection having a field-of-view (FOV) corresponding to a first tileable boundary, the ADOE being designed with:
a pattern mask that prevent projection of light that would otherwise be diffracted into an area outside of the first tileable boundary,
wherein the first SL pattern projection is combined with at least a second SL pattern projection into the tiled SL pattern illuminating the one or more objects in the local area,
a detector configured to capture one or more images of the one or more objects in the local area illuminated by the tiled SL pattern, and
a controller configured to determine depth information for the one or more objects in the local area using the one or more images; and
an optical assembly configured to direct the image light to an exit pupil of the HMD corresponding to a location of a user's eye, the image light comprising the determined depth information.

11. The HMD of claim 10, further comprising:
a second ADOE configured to diffract some portion of the light beams to form the second SL pattern projection, the second SL pattern projection having a FOV corresponding to a second tileable boundary, the second ADOE being designed with a second pattern mask that prevents projection of light that would otherwise be diffracted into an area outside of the second tileable boundary,
wherein the projector is configured to generate the tiled SL pattern by spatially-multiplexing illumination of a first portion of the local area with the first SL pattern and illumination of a second portion of the local area that is adjacent to the first portion with the second SL pattern.

12. The HMD of claim 10, wherein the projector is configured to generate the tiled SL pattern by time-multiplexing illumination of a first portion of the local area with the first SL pattern and illumination of a second portion of the local area that is adjacent to the first portion with the second SL pattern.

13. The HMD of claim 10, wherein the first tileable boundary is rectangular, and the ADOE is designed to generate a pattern for light projection rectangular in shape having a FOV of size $\theta_h$ degree×$\theta_v$ degree defined as:

where $\theta_h$ is an angular field of view in horizontal direction, $\theta_v$ is an angular field of view in vertical direction, $1 \leq i_h \leq 2n_h+1$, $1 \leq i_v \leq 2n_v+1$, $(2n_h+1) \times (2n_v+1)$ is a size of the original design pattern bitmap, $i_h$ is an integer that represents a horizontal coordinate in the design pattern bitmap, $i_v$ is an integer that represents a vertical coordinate in the design pattern bitmap, $n_h$ is an integer that represents an index in a horizontal direction of the design pattern bitmap, $n_v$ is an integer that represents an index in a vertical direction of the design pattern bitmap, $M(i_h,i_v)$ is a normalized intensity of an emitted light beam in a position $(i_h,i_v)$ in the design pattern bitmap after being diffracted by the ADOE, $\alpha_h$ is a diffraction order separation in horizontal direction, and $\alpha_v$ is a diffraction order separation in vertical direction.

14. The HMD of claim 10, wherein the first SL pattern projection is at a first range of wavelengths and the second SL pattern projection is at a second range of wavelengths that are different from the first range.

15. The HMD of claim 14, wherein the detector comprises a plurality of band-pass filters configured to process light of the first range of wavelengths and the second range of wavelengths reflected from the one or more objects in the local area.

16. The HMD of claim 10, wherein:
the controller is further configured to provide the determined depth information to a processor of the HMD; and
the processor is configured to generate content for presentation on the electronic display based on the depth information.

17. The HMD of claim 10, wherein the FOV corresponding to the first tileable boundary and the FOV corresponding to the second tileable boundary are the same size.

18. A station comprising:
a depth camera assembly (DCA) comprising:
a projector configured to emit a tiled structured light (SL) pattern onto one or more objects in a local area, each illumination source of the projector comprising:
a plurality of light emitters that emit a plurality of light beams, and
an augmented diffractive optical element (ADOE) configured to diffract at least a portion of the light beams to form a first SL pattern projection, the first SL pattern projection having a field-of-view (FOV) corresponding to a first tileable boundary, the ADOE being designed with:
a pattern mask that prevents projection of light that would otherwise be diffracted into an area outside of the first tileable boundary,
wherein the first SL pattern projection is combined with at least a second SL pattern projection into the tiled SL pattern illuminating the one or more objects in the local area,
a detector configured to capture one or more images of the one or more objects in the local area illuminated by the tiled SL pattern, and $$M(i_h, i_v) = \begin{cases} 1, & |(i_h - (n_h+1))\sin(\alpha_h)| \leq \sin\left(\frac{\theta_h}{2}\right) \text{ AND } |(i_v - (n_v+1))\sin(\alpha_v)| \leq \sin\left(\frac{\theta_v}{2}\right) \\ 0, & \text{otherwise} \end{cases},$$

a controller configured to determine depth information for the one or more objects in the local area using the one or more images.

19. The station of claim 18, further comprising:
a second ADOE configured to diffract some portion of the light beams to form the second SL pattern projection, the second SL pattern projection having a FOV corresponding to a second tileable boundary, the second ADOE being designed with a second pattern mask that prevents projection of light that would otherwise be diffracted into an area outside of the second tileable boundary,
wherein the projector is configured to generate the tiled SL pattern by spatially-multiplexing illumination of a first portion of the local area with the first SL pattern and illumination of a second portion of the local area that is adjacent to the first portion with the second SL pattern.

20. The station of claim 18, wherein the controller is further configured to send the determined the depth information to a head-mounted display (HMD) positioned in the local area.

* * * * *

UNITED STATES PATENT AND TRADEMARK OFFICE
CERTIFICATE OF CORRECTION

PATENT NO. : 10,158,845 B2
APPLICATION NO. : 15/409314
DATED : December 18, 2018
INVENTOR(S) : Zhu et al.

Page 1 of 1

It is certified that error appears in the above-identified patent and that said Letters Patent is hereby corrected as shown below:

In the Claims

In Column 21, Line 20, Claim 20, after "the determined" delete "the"

Signed and Sealed this
Second Day of July, 2019

Andrei Iancu
*Director of the United States Patent and Trademark Office*